United States Patent [19]
Moody, Jr. et al.

[11] 3,811,805
[45] May 21, 1974

[54] HYDRODYNAMIC THRUST BEARING ARRANGEMENT FOR ROTARY SCREW COMPRESSOR

[75] Inventors: Harold W. Moody, Jr.; Donald D. Schaefer, both of Farmington, Conn.

[73] Assignee: Dunham-Bush, Inc., West Hartford, Conn.

[22] Filed: May 16, 1972

[21] Appl. No.: 253,752

[52] U.S. Cl............... 418/88, 418/99, 418/203, 417/410
[51] Int. Cl............... F01c 1/16, F01c 21/04
[58] Field of Search........ 418/203, 99, 88; 415/104; 417/410

[56] References Cited
UNITED STATES PATENTS

| | | | |
|---|---|---|---|
| 2,715,367 | 8/1955 | Kodet et al. | 415/111 UX |
| 3,398,886 | 8/1968 | Roach | 418/88 |
| 3,481,532 | 12/1969 | Fraser | 418/203 |
| 3,625,576 | 12/1971 | Miller | 301/170 X |

*Primary Examiner*—Carlton R. Croyle
*Assistant Examiner*—Richard E. Gluck
*Attorney, Agent, or Firm*—Sughrue, Rothwell, Mion, Zinn & Macpeak

[57] ABSTRACT

The female drive screw of an axial screw compressor directly drives an oil pump at the end of the screw supporting shaft, remote from the motor, which delivers high pressure oil to hydrodynamic thrust bearings between the ends of the male and female screws and the end plate at the discharge side of the compressor. The female screw is hollow and forms an oil passage with both screws incorporating inclined radial passages to direct pressurized oil to their discharge end faces. Oil balance pistons carried by the screw supporting shafts are subjected to high oil pressure to overbalance the created thrust on the screws due to compression of the working fluid.

5 Claims, 4 Drawing Figures

HYDRODYNAMIC THRUST BEARING ARRANGEMENT FOR ROTARY SCREW COMPRESSOR

BACKGROUND OF THE INVENTION

1. Field of the Invention

This invention relates to rotary screw compressors, and more particularly, to thrust compensation and bearing arrangement for the same.

2. Description of the Prior Art

Axial screw compressors have recently come into vogue in the refrigeration and air conditioning fields. They have few moving parts and are relatively maintenance free. One application of the rotary screw compressor to refrigeration systems is set forth in U.S. Pat. No. 3,408,827 to Soumerai et al., issuing Nov. 5, 1968, and assigned to the common assignee. Such screw compressors are characterized by the fact that the male screw or rotor drives the female screw or rotor and, as such, large male rotor thrust loads occur with relatively smaller female rotor thrust loads, due to the compression of the refrigerant working fluid. In male driven rotary screw compressors, the male rotor is subjected to the higher thrust component due to the forces derived from compression of the gas, because it has the higher cross section area, against which the pressurized gas transmits its force. Further, there is a reaction thrust force due to the fact that the male rotor is driving the female rotor, and this reaction thrust adds to the thrust created by the compression of the gas.

Rotary screw compressors of prior art design normally employ anti-friction bearings for both radial and axial thrust loads or employ sleeve journal bearings for taking up the radial loads and anti-friction bearings for supporting the thrust load. There have been attempts to provide axial screw compressors which employ anti-friction thrust bearings that further use system oil pressure to partially balance the thrust loads generated so that the anti-friction thrust bearings only carry a fraction of the generated thrust load. However, in all cases where anti-friction bearings are employed, a mechanical lock-up is necessary so that the rotor is basically set rigidly with a predetermined rotor end clearance and wherein; regardless of the encountered thrust load, the end clearance remains constant in the absence of bearing wear. In such cases, compressors with mechanically set end clearances inherently have undesirable internal gas leakage at the discharge end of the rotors. That is, due to the necessity for maintaining a predetermined rotor end clearance, the compressed working fluid tends to leak to the intake side of the compressor. The prior art rotary screw compressors employing anti-friction bearings are necessarily expensive, especially where the male screw drives the female. The present anti-friction bearings, because of size needed for maximum thrust loads, have an undesirable calculated design life requiring field maintenance at predetermined intervals.

It is, therefore an object of the present invention to provide an improved, helical rotary screw compressor in which the bearing system is not limited to a finite life and has reduced thrust loads in comparison to similar capacity prior art machines.

SUMMARY OF THE INVENTION

The present invention is directed to an improved helical, rotary screw compressor in which the thrust bearing system for the compressor operates hydrodynamically and is characterized by an insignificant wear rate. The compressor is designed to be male or female rotor driven, and is preferably female rotor driven to make use of the higher power transferred from the female rotor to the male rotor and to employ this power to counteract some of the thrust generated by the gas during compression. This results in a reduction of the male rotor total thrust offset by a slight increase in the lightly thrusted female rotor (in male drive mode). The bearing and thrust compensation system of the present invention is particularly useful in a rotary screw compression which incorporates means for providing a variable oil pressure which is capable of overcompensating the generated rotor thrust load during all points of compressor operation. Both the male and female rotors are hydrodynamically thrusted against the discharge end of the compressor to provide minimum, self-compensating clearance at the discharge end of the machine, greatly reducing leakage of the high pressure discharge working fluid to the intake side of the machine.

In a preferred embodiment, the female screw or rotor is fixed to the drive motor shaft, for rotatably driving the intermeshed male screw or rotor which is mounted for rotation about a fixed internally projecting stub support shaft extending parallel to the female drive shaft. Oil balance pistons are fixed to the ends of respective shafts at the intake side of the compressor. A rotary oil pump is driven by the female screw and provides oil pressure acting against the oil balance pistons to overcompensate for the developed thrust acting on the screws during compression and forces both screws against thrust plates at the discharge side of the screws with minimum clearance. Oil pressure is supplied to diagonal, radial holes opening into the rotor ends. This provides pressurized oil to create hydrodynamic thrust bearings between the rotor ends and the surface of the facing thrust plate. Low coefficient of friction materials may be spray-coated on the thrust plates and/or rotor ends to reduce friction therebetween. The hydrodynamic oil film which carries the rotor thrust loads allows a much smaller running clearance at the discharge end of the compressor which results in lower rotor end gas leakage over that of the prior art screw compressors.

DESCRIPTION OF THE PREFERRED EMBODIMENT

Figure 1:
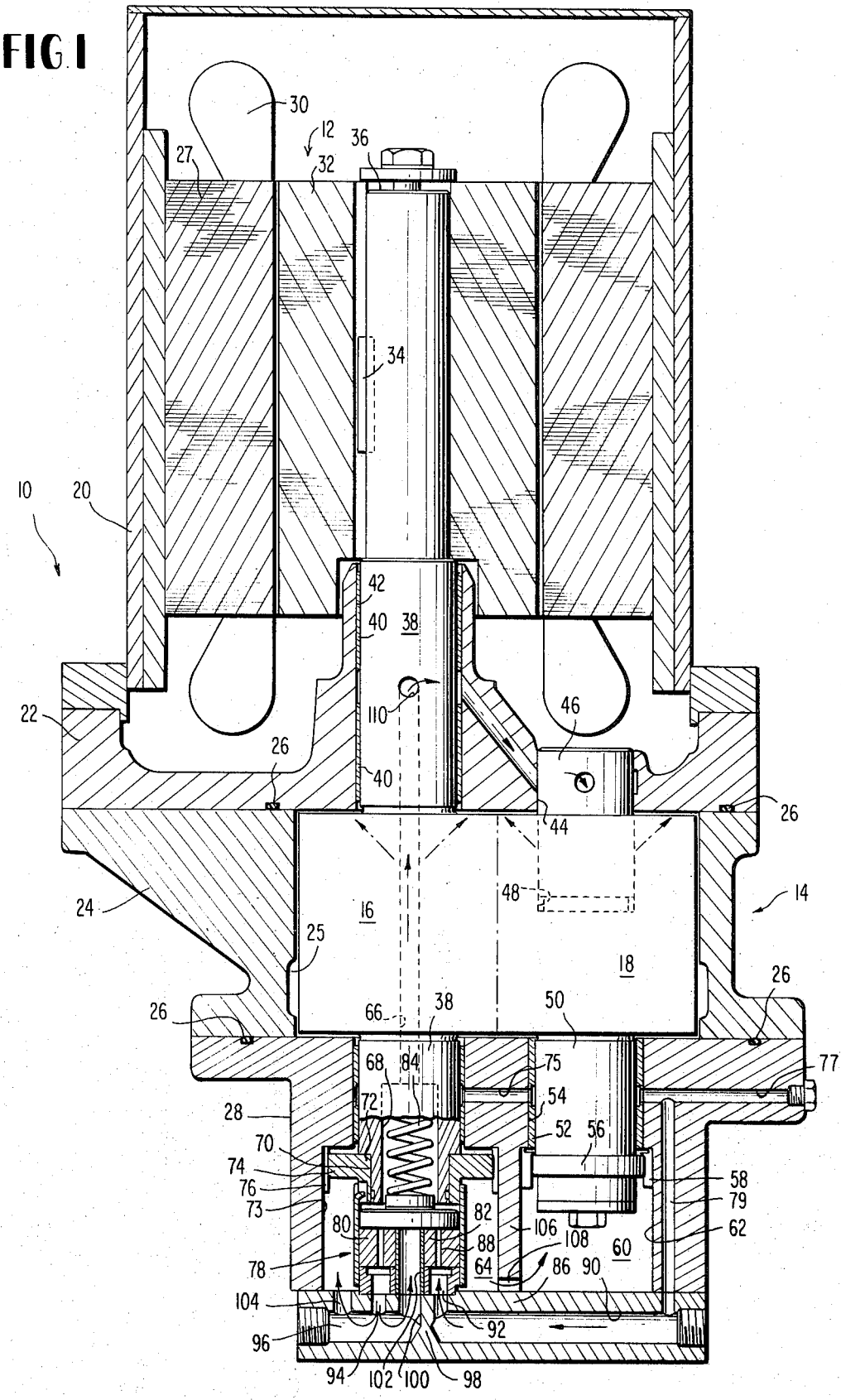
FIG. 1 is a sectional view of a helical, rotary screw compressor incorporating the hydrodynamic thrust bearing system of the present invention.

Reference to FIG. 1 illustrates a helical rotary screw compressor which may be employed in a refrigeration system similar to that of the referred to Soumerai et al.

U.S. Pat. No. 3,408,827. As such, the screw compressor 10 consists essentially of two major components, the electric drive motor 12 at the right hand side of the assembly, and the screw compressor assembly 14 to the left hand side, constituted essentially by meshed, helical, rotary screws or rotors; the female screw 16 in this case directly driving the male screw 18. Essentially, the motor housing 20 is provided with an end plate or thrust plate 22 for the screw compressor assembly 14, the screw compressor being provided with a cylindrical housing or casing section 24 and being coupled to the end plate 22 by bolts or similar coupling means (not shown) at circumferentially spaced positions. O-rings 26 on the end faces of a further screw compressor casing or housing 28 and end plate 22 insure sealing between the axially coupled casing sections of the combination unit 10. Further, bolts or the like may be employed to couple casing sections 24 and 28 together in a similar manner to that coupling the end plate 22 to casing 24. The motor 12 is provided with the stator indicated generally at 27 carrying windings 30 and has concentrically supported within the same, the motor rotor 32 which is keyed at 34 to a motor shaft 36. Shaft 36 is further connected to, or acts as an extension of, the female screw or rotor support shaft 38. The female screw or rotor support shaft 38 is supported for rotation about its axis by sleeve bearings 40 which are fixed within bore 42 of the end plate 22. The screw compressor casing section 24 is provided with an internal cavity 25 within which are positioned intermeshed female screw 16 and male screw 18 with the compressor discharge ends of the screws being to the right and the intake ends being to the left. The thrust plate 22 is further provided with a second bore 44 transversely or laterally offset from bore 42 within which is carried a fixed stub shaft 46, stub shaft 46 protruding within a cylindrical recess 48 extending partially through the center of male screw 18. It is to be noted, that the driven male screw 18 incorporates as an extension thereof, support shaft 50 which is carried by sleeve bearing 52, this bearing received within bore 54 casing or housing section 28. Shaft 50 is provided with a radially enlarged section, which defines an oil balance piston 56. Piston 56 may be a separate element, or simply an enlarged diameter portion of shaft 50, the balance piston 56 making peripheral contact with an annular seal or sleeve 58 carried within chamber 60 formed by wall 62 of the housing 28. A second chamber 64 receives the protruding end of female rotor support shaft 38 to the side opposite drive motor 12. This portion of shaft 38 is bored at 66 to define an axial small diameter fluid passageway and is counterbored at 68. Further, shaft 38 carries a peripheral recess 70 forming shoulder 72 against which abuts a second oil balance piston 74 which provides an end surface area somewhat larger than that of oil balance piston 56 associated with shaft 50 of the male screw 18. Again, an annular seal or sleeve, as at 76, is provided between the outer periphery of the oil balance piston 74 and wall 73 of casing or housing section 28 defining cavity 64.

Operatively associated with left hand end shaft 38 is an oil pump assembly indicated generally at 78 of the lobe gear type generally available to the industry. This is essentially a lobe pump of the type shown in U.S. Pat. No. 3,343,494 including a stator 80 specially formed to carry a rotatable, driven rotor 82; rotor 82 being spring biased by means of coil spring 84 into contact with a fixed end plate 86 extending across and sealed to casing section 28. End plate 86 is provided with particular fluid passages permitting entry and discharge of the oil to and from spaces 88 between the teeth of the rotor and stator for pressurization and discharge. The oil pump 78 forms no part of the present invention other than its use as an element within the lubrication and hydrodynamic thrust bearing system of the improved screw compressor.

In general, oil within transverse passage 90 of end plate 86 is directed through right angle inlet passages 92 where it moves between the inner rotor 82 and the outer, fixed stator 80 and is pressurized therebetween for discharge through outlet passage 94 to a right angle transverse passage 96 which is bored within the end plate 86 and in line with passage 90 but separated therefrom by wall 98. To the side of passage 94, is provided a passage 100, which is aligned with the center of the stator 80 and through which tube 102 passes which acts to support the stator 80. Another passage 104 directs pumped oil into the relatively large cavity 64 for pressurization of the left hand end face of the female screw oil balance piston 74. A wall 106 which separates cavities 60 and 64 is provided with one or more openings 108 permitting the high pressure oil to enter cavity 60 and impinge against the left hand end face of the male oil balance piston 56.

Figure 2:
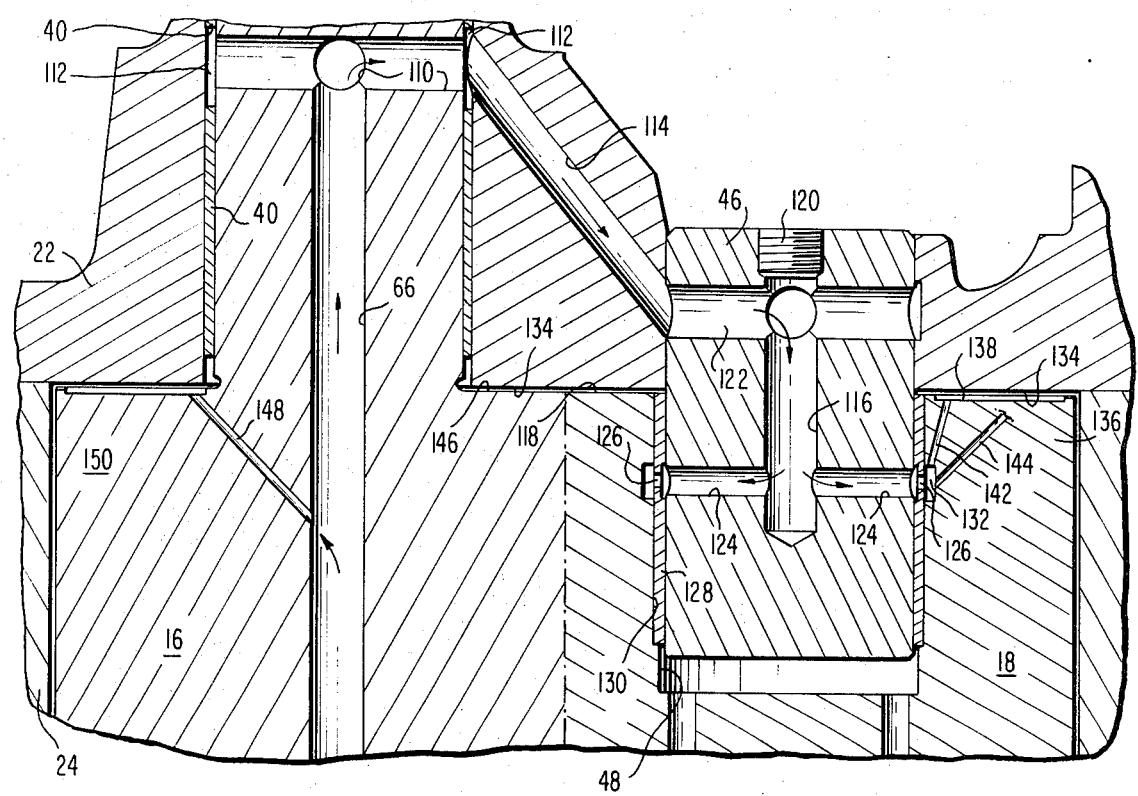
FIG. 2 is an enlarged, sectional view of a portion of the screw compressor of FIG. 1 illustrating the pressurized oil circuit for the hydrodynamic thrust bearings of the present invention.
Figure 4:
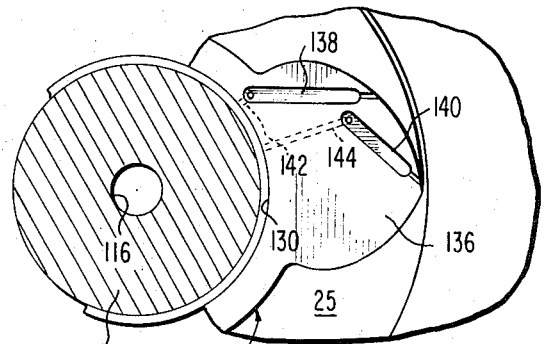
FIG. 4 is an end view, partially in section, of a portion of the male rotor of the screw compressor of FIG. 1.

Pressurized oil passes axially through the gear pump 78 by passage means (not shown) at the end of tube 102 and enters the cavity created by counterbore 68 within shaft 38 which carries the compression spring 84 and further passes from left to right through the small diameter oil passage 66. The oil flows through the center of the female rotor 16 and eventually intersects a right angle drilled hole or passage 110, FIG. 2, which is aligned with annular space 112 between the sleeve bearings 40. The end plate 22 is provided with an inclined oil passage 114 which intersects space 112 and directs pressurized oil to the fixed stub shaft 46 which supports the driven male rotor 18. Stub shaft 46 is provided with an axially drilled hole or bore 116 which extends partially through the same to a distance beyond the discharge end face 118 of the male rotor or screw 18, bore 116 carrying at its outboard end, a threaded plug 120 sealing off this passage. A transverse bore 122 intersects axial bore 116 and connects the inclined fluid passage 114 to bore 116. Near the inner end of bore 116 are provided a plurality of radially drilled holes 124 which open up onto the periphery of the fixed stub shaft 46 the radial holes 124 being aligned with small openings 126 within sleeve bearing 128 fixed to male rotor 18. Sleeve bearing 128 is fixedly received within counterbore 130 of driven male screw 18. The depth of the bore 48 within the male screw 18 is greater than the length of the fixed stub shaft 46 which projects beyond the end plate 22 and which fixedly supports the same. Further, male screw or rotor 18 is provided with an annular recess 132 which is circumferentially aligned with the series of holes 126 within the sleeve bearings 128 and the radial bores 124 of fixed shaft 46, such that pressurized oil is distributed in a circular path within the interior of the driven screw 18. In creating a hydrodynamic oil thrust bearing between the end face 118 of the driven male rotor or screw 18 and the thrust surface 134 of end plate 22, preferably, for each male lobe 136, on its end face 118, there is provided a pair of shallow grooves 138 and 140 which extend generally radially but are inclined relative to each other. Groove 138 runs almost the full distance from the inner periphery 130 adjacent the stub shaft 46 to its outer peripheral edge, while groove 140 starts at approximately the termination point of groove 138 and extends outwardly towards the full peripheral tip of the lobe 136, but is not parallel to groove 138 and is in fact inclined with respect thereto. The inner ends of each of the grooves 138 and 140 are in fluid communication with the annular recess 132 within counterbore 130 of the driven male screw 18 by means of radially inclined passages 142 and 144 respectively. This permits high pressure oil to be delivered to the thrust face 134 of end plate 22, thus creating a hydrodynamic oil bearing between the end face 118 of each lobe 136 of the screw and the end plate 22.

Figure 3:
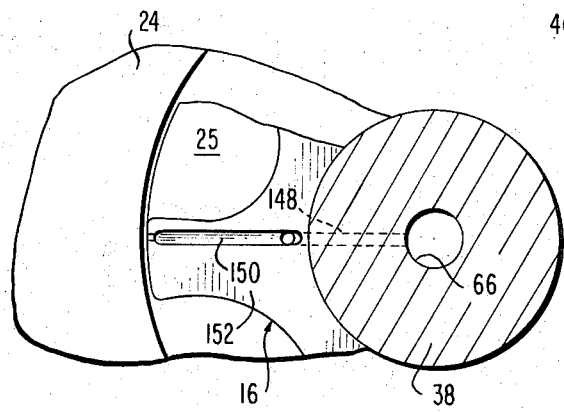
FIG. 3 is an end view, partially in section, of a portion of the female rotor of the screw compressor of FIG. 1.

In conjunction with the driven female rotor or screw 16, a hydrodynamic thrust bearing is achieved between the discharge end face 146 and the thrust surface 134 of end plate 22 in essentially the same manner. This may be seen by reference to FIG. 3, taken in conjunction with FIG. 2, wherein radially inclined passages 148 of small diameter fluid couple the axial bore 66 of the driving shaft 38 to the inboard end of each shallow groove 150 carried on each lobe end face 146 of rotor 16. Radial groove 150 extends generally parallel to its radially projecting lobe 152 of the female drive screw 16. In that respect, the groove 150 runs almost to the full radial extent of the lobe end face and is provided with a very shallow portion at its outboard end.

It is to be noted that the bearing system of the present invention relies essentially on the employment of low cost sleeve bearings for absorbing radial loads and hydrodynamic thrust bearings for absorbing developed axial thrust loads. The compressor operates with its rotor axis oriented vertically, horizontally or at some angle therebetween and as such, accumulated oil which is sucked into bore 90 of face plate 86, enters the rotary gear pump 78 through inlet opening 92 and is discharged therefrom through outlet opening 94 within the same plate 86 at high pressure splitting within passage 96. A portion of the same enters cavities 60 and 64 for applying the relatively high oil pressure against the lower end face of the balance pistons 56 and 74. This oil pressure drops from bottom to top and therefore pushes everything, that is, towards the discharge side of the screw compressor working chamber 25 in which is positioned the intermeshed male and female screws or rotors 18 and 16. While neither the working fluid inlet to the compressor or its discharge passage is illustrated, essentially the intake lies adjacent to the lower end face of the rotors, while the discharge lies adjacent the upper end faces 118 and 146 of the male and female screws 18 and 16 respectively. With the compressor working fluid inlet pressure acting on the upper faces of the balance pistons 56 and 74, the oil pressure drives both screws upwardly tending to close the gap between the upper ends of the screws and the thrust face 134 of end plate 22. Since there is less thrust forces acting on the male rotor or screw 18 as against the female rotor or screw 16, the surface area of balance piston 56 is substantially less than of balance pistons 74. It is to be remembered, that the discharge gas pressure acts on the upper ends of both the male and female screws and on the shafts supporting the same, which is of course overcompensated by the high pressure oil pressure acting on the opposite ends of the shafts and the balance pistons supported thereby. Further, suction pressure is acting on the lower ends of the male and female screws and the function of the system of the present invention is to insure adequate oil pressure within cavities 60 and 64 to overcome the thrust due to gas compression and reaction forces between the driving female screw 16 and the driven male screw 18, and tending to seat the end faces of the male and female screws against the thrust surface of the end plate 22. It is essential that substantially none of the oil passes from chambers 60 and 64 to the inlet or intake side of the screws, since this reduces the volumetric capacity of the compressor without any major beneficial result. The effect of the refrigerant rich oil on the volumetric capacity of the compressor must be minimized. Oil in seeping past seals 58 and 76 at the peripheries of the oil balance pistons 56 and 74, enters a passage way (not shown) to an interlobe space which is not in communication with either the intake or discharge pressures. Passages 75, 77 and 79 permit oil to reach the bearings for shafts 38 and 50. Of particular importance to the present invention, is the fact that the high pressure oil discharge passes through the center of the gear pump 78 and moves within axial passage 66 within the center of the female screw 16, whereupon a portion exits through multiple inclined radial passages 148 to form the hydrodynamic thin film bearing in conjunction with the radial grooves 150 carried by each of the lobes 152 of the driving female screw 16. Screw 16 immediately shifts away from the thrust surface 134 of end plate 22, a distance determined by the extent of the axial thrust load acting on the screw and the flow rate of pressurized oil which defines the hydrodynamic thin oil film bearing at that point. In general, axial screw compressors are unloaded during start up so that there is little wear at this point and the hydrodynamic thin oil film is created almost instantaneously by operation of gear pump 78. High pressure oil further passes through radial passage 110 and inclined passage 114 to the fixed stub shaft 46 where it is distributed through passages 122, 116 and 124 to the annular recess within the high speed rotating driven male screw 18. From here it passes to each lobe via inclined passages 142 and 144 to the paired grooves or slots 138 and 140 on each end lobe face of the driven male screw 18 to form a hydrodynamic thin film fluid bearing between the end face 118 of that screw and the thrust face 134 of the end plate 22. In each case, the hydrodynamic bearing formed at the discharge end of the screw acts in opposition to the pressure differential across the balance pistons 58 and 74 but these are purposely designed to overbalance the load and create a force tending to maintain a minimal end clearance between the end faces of the high speed rotating screws, and the fixed end plate 22. A minimum volume of high pressure oil leaks axially between the sleeve bearing 40 and upper portion of shaft 38 from the hydrodynamic bearing associated with the driving female screw 16, while in similar fashion, some leakage occurs in the opposite direction along the sleeve bearing 130 which surrounds the stub shaft 46 and supports internally the female driving screw 18.

From the above, it is evident that the system of the present invention provides a simplified bearing arrangement employing sleeve bearings which act in conjunction with hydrodynamic thrust bearings, particularly for a helical, rotary screw compressor of the female drive type. The system of the present invention is designed to accommodate large thrust loads generated by the screws, and because there is no contact between the moving parts subsequent to start up, the thrust bearings have infinite life.

While the invention has been particularly shown and described with reference to a preferred embodiment thereof, it will be understood by those skilled in the art that various changes in form and details may be made therein without departing from the spirit and scope of the invention.

What is claimed is:

1. In a screw compressor having high and low pressure sides including intermeshed male and female screws mounted for rotation about respective parallel axes and having end faces to one side of a fixed thrust surface, said screws acting to compress a working fluid therebetween from the low pressure side to the high pressure side of the compressor, the improvement comprising:

means for applying pressurized oil axially to said screws in a direction to create a counterthrust which overcompensates for thrust forces developed on the screws as a result of working fluid compression to force the screws axially toward said thrust surface at the high side of the compressor, and means for providing a hydrodynamic fluid bearing between the end faces of both the male and female screws and said thrust surface to prevent contact therebetween during operation of the compressor and to maintain an oil film controlled minimum clearance therebetween to reduce escape of compressed fluid from the high pressure side of the compressor.

2. In an axial screw compressor including casing means defining a working chamber, having axially spaced intake and discharge ends, intermeshed male and female screws having discharge end faces and being mounted for rotation about parallel axes within said working chamber for compressing working fluid between said intake and discharge ends, the improvement comprising:

a thrust surface defined by said casing means, means for driving said female screw, an oil pump operatively coupled to one of said screws and driven thereby, sealed balance piston means coupled to respective shafts at the intake ends of said screws, means for subjecting said balance pistons to oil pump discharge on one surface thereof to create a counterthrust force acting axially on said screws which is greater than the thrust forces developed within the screws during compressor operation, and means forming a thin film, pressurized oil bearing between the discharge end face of each screw and said casing means thrust surface to maintain an oil film controlled minimum axial clearance therebetween during compressor operation, thereby reducing loss of compressed fluid and reducing wear on said screws.

3. The axial screw compressor as claimed in claim 2, wherein said female screw is supported by a shaft extending axially beyond respective end faces of the female screw, sleeve bearings are carried by said casing to support said female screw shaft to each side of said female screw, said female screw includes an axial bore defining an axial oil passage within the same, and said screw further includes a plurality of radial passages leading from said axial bore to the discharge end face of said female screw at each lobe location and said compressor further includes means for fluid coupling the discharge side of said oil pump to said female screw axial bore.

4. The axial screw compressor as claimed in claim 2, wherein; said female screw is supported by a shaft extending beyond the respective end faces of said screw, said casing means includes sleeve bearings for radially supporting said female support shaft, a stub shaft is fixed to said housing means, projects from one end of said casing means parallel to said female screw shaft and to one side of the female screw support shaft, said male screw is bored centrally to a depth approximating the projection of said stub shaft and receives the same, a sleeve bearing is carried by said male screw for rotatably supporting the same, said axial screw compressor further includes an electric motor for rotating the same, said motor being positioned at the discharge side of said compressor and has a rotor fixed to said female screw support shaft and a stator concentrically positioned with respect to said rotor and having stator coils partially surrounding said female screw support shaft with said coil having ends terminating in a plane spaced slightly from the end of said stub shaft remote from said male screw, whereby, the axial length of the screw compressor is effectively reduced.

5. The axial screw compressor as claimed in claim 4 wherein; said oil pump comprises a pump operatively coupled to the end of said female shaft, beyond its balance piston, said oil pump has an axial discharge passage coaxial with said female screw axial bore and is in fluid communication therewith, fixed passage means are formed within said casing means at the discharge end of said female screw and extend to said stub shaft, radial passage means are carried by said female screw support shaft, said stub shaft is bored axially, radial passage means couple said stub shaft axial bore to the periphery of said stub shaft and are in line with said passage means within said housing means intermediate of said shafts, radial passage means lead from said bore of said stub shaft, internally of the screw ends to an annular recess within the bore of said male screw and radial passage means lead from said annular recess to the end face of said female screw at each lobe location, whereby, thin film, hydrodynamic oil bearings are created on the discharge end faces of both the female and male screws in opposition to said counterthrust forces.

* * * * *